Jan. 28, 1958  W. C. RUDD  2,821,619
CONTINUOUS WELDING OF STRIPS AND THE LIKE
Filed Dec. 7, 1955  2 Sheets-Sheet 1
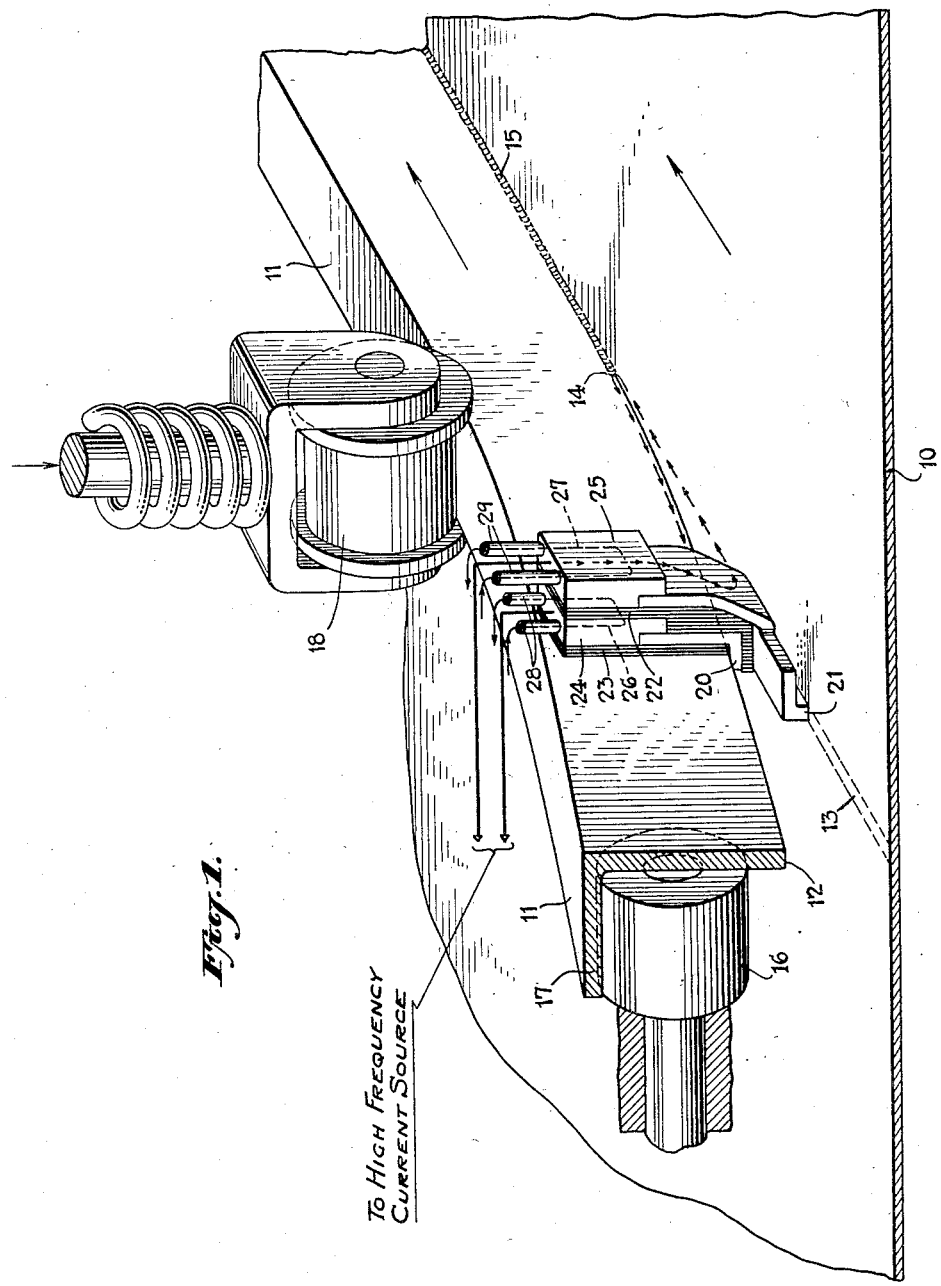
INVENTOR.
WALLACE C. RUDD.
BY
ATTORNEYS.

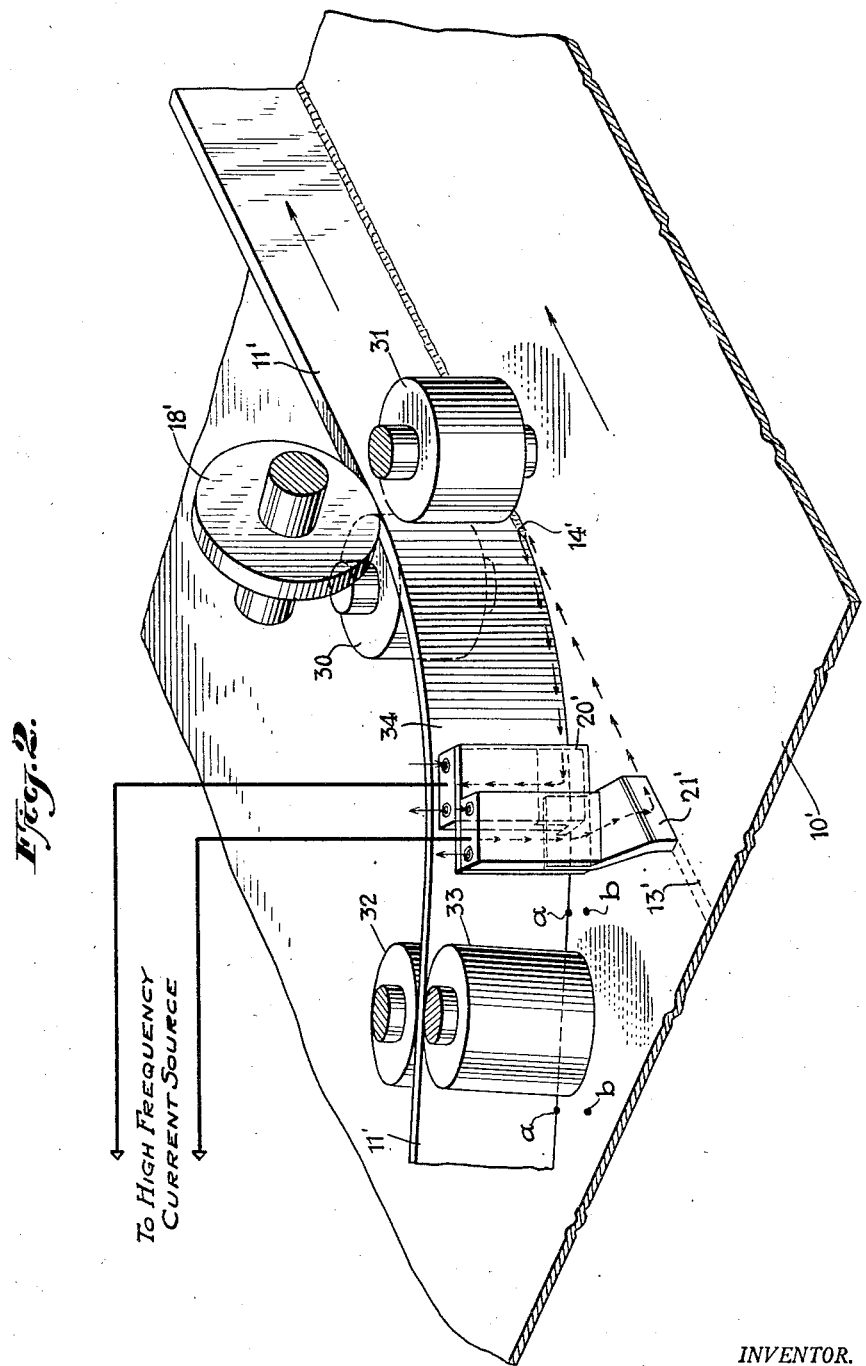

United States Patent Office 2,821,619
Patented Jan. 28, 1958

2,821,619

CONTINUOUS WELDING OF STRIPS AND THE LIKE

Wallace C. Rudd, Larchmont, N. Y., assignor to Magnetic Heating Corp., New Rochelle, N. Y., a corporation of New York Application December 7, 1955, Serial No. 551,566

2 Claims. (Cl. 219—107)

This invention relates to methods and apparatus for welding by the use of high frequency electrical resistance heating and more particularly for the welding of more or less continuous metal strips or the like to metal plates or to other strips.

Reference is made to the copending application of Wallace C. Rudd and Robert J. Stanton, Serial No. 421,768, filed April 8, 1954, and to their preceding application Serial No. 332,422, filed January 21, 1953 (now abandoned), the subject matter of said applications being disclosed also in Belgian Patent No. 530,877, granted August 31, 1954. Said applications and said patent disclose a method and means for welding together the edges defining the longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point. The present invention involves a novel apparatus arrangement and alternative methods such as to provide for the welding together of the above-mentioned metal strips and the like and to weld such strips to plates.

The problem of securely welding the edge of a metal strip to a plate or another strip in a manner such that there will be a firm bond throughout the edge areas of the strips, has heretofore involved serious difficulties, particularly in view of the problem of obtaining access to the areas of the strip edges in any such manner as to permit uniform heating over the surfaces which are brought together and welded and without injuriously heating and possible buckling or permanently distorting the parts. Thus the use of arc forming electrodes or a welding flame at the weld point in such situations has not, so far as is known, been productive of entirely satisfactory results; neither has the use of induction heating coils, because of their inefficiency under such circumstances and the difficulties of so placing and shaping them as effectively to heat only the desired areas to be welded. The use of known methods of electrical resistance heating by direct current or low frequency current would involve prohibitively wasteful heating of excessive areas of the parts.

The use of high frequency electrical resistance heating for this purpose and by the general methods disclosed in the above-mentioned applications, also involves difficulties in heating to an equal degree the strip edge and the desired line of welding on a metal plate, since the plate areas will cause dispersion of heat thereover in all directions, whereas heat from the strip edge can only be distributed in directions away from such edge. There are also difficulties involved in properly placing or mounting the contacts or electrodes which supply the high frequency electrical current and to do so without interfering with the continuous advance of the strips up to and past the weld point. Another serious difficulty involves the proper feeding of the strips so that there will be a desired open gap in advance of the weld point.

The present invention provides a relatively simple, economical and efficient means and method for solving these problems.

Various further and more specific objects, features and advantages of the invention will appear from the description given below taken in connection with the accompanying drawings illustrating by way of example certain preferred forms of the invention.

In the drawings:

Fig. 1 is a perspective view of an arrangement of apparatus according to one embodiment of the invention; and Fig. 2 is a view illustrating a further embodiment of the invention.

Referring to the drawings now in further detail, in Fig. 1 a metal plate 10 is shown, to which is to be welded a strip, band, rod or the like 11. That is, an edge such as at 12 on the strip 11 is to be welded throughout its edge area to a band-like area on the plate as indicated by the dotted lines at 13. Any suitable mechanical means (not shown) may be provided uniformly to advance the plate and the strip in the direction of the arrows shown, past a point 14 (or strictly speaking, a transverse line) at which welding occurs, so that subsequent to that point the strip and plate will be welded together as indicated at 15.

In order to provide a gap for the proper control of the flow of the high frequency current in advance of the weld point, it is necessary to bring the plate and the strip together at a slight angle, that is to say, it is necessary that one or the other of same be deflected somewhat away from a position of alignment with the line of the weld. Thus in the example shown in Fig. 1, the strip 11 if not too rigid may be suitably guided in a curved position up to the weld point. Usually a plurality of guide rollers may be used for this purpose, one of which, for example, is indicated at 16, adapted to engage in this case the undersurface of a horizontal web 17 on the strip 11 which is here shown as being in the form of an angle iron. As the strip and the plate are advanced past the weld point, same are firmly pressed together as by use of a spring pressed roller such as indicated at 18, urged down against the strip 11 and forcing its edge 12 against the upper surface of the moving plate 10. At points shortly in advance of the weld point, contacts or electrodes as shown at 20 and 21 are applied respectively to the under edge 12 on the strip and to the narrow band 13 on the plate which is to be welded to the strip. These contacts may be mounted by any suitable means (not shown) and should be insulated from each other and from the side of the strip as by insulation pieces 22, 23. Such contacts may be suitably affixed respectively to contact holders 24 and 25, such holders being fluid cooled as by the formation of cooling fluid cavities 26, 27 therein, and which are adapted to be connected respectively to conduits 28 and 29 for circulating cooling fluid such as water therethrough.

As shown, the contact holders 24 and 25 respectively are connected to the terminals of a source of high frequency current, such as current of radio frequency of 10,000 cycles per second, or preferably, in the usual case, of a much higher range of frequencies, as for example from about 100 to 500 or more kilocycles.

With the use of such high frequency currents, by far the predominant cause of impedance thereto will be the reactance factor rather than resistance of the circuit.

With the present method, full advantage is taken of this fact in that the contacts 20, 21 are so positioned that the current path therebetween will extend from contact 21 along on the surface of the plate at the narrow band 13 to the weld point 14 and thence along the edge 12 to the contact 20 as indicated by the small arrows. In Fig. 1, the gap between the current paths to and from the weld point 14 is for clearness shown somewhat wider than would generally be the case, or in other words, the strip 11 is shown bent upwardly more than it needs to be, provided the contacts 20, 21 are made as small as possible and are suitably insulated from each other. By keeping the gap between such current paths narrow, the reactance between the current flowing along opposite sides of the gap will be kept at a minimum. Thus the path of lowest impedance for the current flow between electrodes 20, 21 will be confined closely to the edge 12 and to the surfaces of the narrow band 13 on the plate which is to be welded thereto. Thus as any given points on the strip 11 and on the plate 10 reach and pass the contacts, such points will be intensively and quickly heated more and more up to the weld point 14 where the gap is closed and a small steady arc will generally occur, thus further intensifying the heating at the moment of welding.

Although the contacts 20, 21 may be positioned anywhere within close proximity to the lines or areas of desired heating on the strip and the plate respectively, yet preferably in order to confine the current flows just as closely as possible to the exact surface areas or lines to be heated, the contact 20 is shaped and positioned under the edge 12 to slidably engage the surface of such edge directly, and the contact 21 is also shaped and positioned with a depending portion which will slidably engage exactly the band 13 to be heated on the plate.

It will be noted, however, that in the process of heating the band 13 on the plate, the metal of the plate at both sides of such band will provide in effect a heat "sump," whereas in the case of the edge 12 on the strip, heat therefrom can only be conducted by metal to one side, that is, upwardly into the strip. Thus the band 13 on the plate, if heated by the same current as the edge of the strip, will necessarily require a longer interval of heating before such band is heated up to welding temperature, as compared with the edge of the strip. In view of this fact, according to the invention the contact 21 is so shaped, positioned or mounted as to engage the plate some distance in advance of the position or location where the contact 20 engages the strip. These relative distances will vary somewhat depending upon the shape and size of the strip and the thickness of the plate, as well as the metals of which same are formed. In view of that fact, the contact holders 24, 25 are preferably mounted to be relatively adjustable in the direction of the line of the weld or, of course, they may be mounted in fixed positions determined by trial if the set-up is to be continuously used with the same forms and types of strips and plates. In other words, the contacts should be so mounted with respect to the weld point and with respect to each other that the edge 12 and the band 13 will be raised to substantially the same temperature, viz. the desired welding temperature at the moment when same come into contact at the weld point 14. These relative temperatures may be fairly well judged by observing the relative degrees of incandescence of the heated areas as they come to the weld point.

In many cases, the cross section of the strip which is to be welded to the plate will be such that it will be difficult or impossible adequately to bend the strip up from the plate where it is approaching the weld point without permanent distortion. To overcome this difficulty, the arrangement shown in Fig. 2 may be used. Here the parts corresponding generally to those of Fig. 1 are identified by the same reference characters accompanied by prime marks. The strip 11' instead of being led up to the weld point in a position in alignment with the line of the weld, is instead arranged to come in from one side and is bent transversely and slightly twisted and so that its lower edge will travel along a curve and thence to the line of the weld, and with such curvature and twisting, it will be found that even a quite rigid strip can readily be bent up away from the plate far enough to be adequately spaced therefrom until the weld point is reached. To accomplish this, guide rollers as at 30, 31 may be provided on axes vertical to the plate 10' to hold the strip vertical to the plate at the region of the weld point 14' and a spring-pressed roller 18' may be used for purposes corresponding to the roller 18 in Fig. 1. Of course if the strip is to be welded at an angular position relative to the plate (other than at right angles) then these rollers would be correspondingly positioned at angles to the plate.

In advance of the weld point and further in advance than the contacts 20', 21', a pair of rollers as at 32, 33 may be provided and located in contact with the opposite surfaces of the strip. These rollers, it will be noted, are mounted on axes, the upper portions of which are canted at a slight angle forwardly toward the weld point, since they engage the strip at a region where same is being fed at a slight angle downwardly. These rollers are also canted slightly at their upper portions toward the viewer of Fig. 2 to impart the above-mentioned twist to the strip. The portion of the strip indicated at 34 as it advances toward the rollers 30, 31, will bulge slightly to the right, that is in the direction toward the viewer of Fig. 2. In this way, quite wide strips or ribbons of metal which are consequently quite rigid in the direction of their width, may be readily so bent or twisted that points on the lower edge thereof as at $a$ will be adequately spaced from points such as at $b$ directly thereunder on the plate.

The construction and operation of the remaining portions of Fig. 2, will be evident from the above description of Fig. 1.

The term "metal strip" as used herein is intended to refer to elongated members which may have any desired cross-sectional shape, such as angle irons, ribs, bars, metal ribbons or the like. The term "metal plate" as used herein is intended to refer to members having substantial surface areas in both of two dimensions, which areas need not necessarily be flat. The welding of metal aeroplane wing surfaces to supporting ribs for example constitutes one possible use of the invention.

Having thus described the invention with particularity with reference to preferred forms, and having described and referred to certain modifications, it will be obvious to those skilled in the art, after understanding the invention, that various changes and other modifications may be made therein without departing from the spirit and scope thereof, and I aim in the appended claims to cover such changes and modifications as are within the scope of the invention.

What is claimed and desired to be secured by Letters Patent is:

1. Method for welding an edge of an elongated strip-like member along a line on another metal member, the dimensions and compositions of said members being such that the capability of the strip to distribute heat applied to points along said edge into other portions of the strip is substantially different from the capability of said other member to distribute heat applied to points along said line into other portions of said other member, such method comprising: uniformly moving said strip and said other member to come together at a weld point located on the desired line of welding, while maintaining said members spaced apart in advance of the weld point by a narrow generally V-shaped gap terminating at the weld point; heating an edge of the strip in advance of the weld point; and also heating said other member along said line in advance of the weld point, said heating being accomplished by applying contacts which are connected to a radio frequency current source, one of said contacts engaging the strip at or adjacent said edge at a point in advance of the weld point and the other of said contacts engaging said other member at a point on said line in advance of the weld point, the contact which engages the member having the greater heat distributing capability being located at a distance from the weld point sufficiently greater than the distance of the other contact from the weld point, whereby opposed points of welding on the two members when they reach the weld point will be heated approximately to welding temperature, said current being of such radio frequency that the lowest impedance path therefor between the contacts extends from the contacts to and from the weld point along the opposed sides of said gap, and the resulting resistance heating being substantially concentrated along said gap.

2. Method in accordance with the foregoing claim 1 and in which said other metal member comprises a generally flat plate and said strip as it is advanced toward the weld point, is held in a somewhat twisted condition, the twisting being to a sufficient degree whereby said edge in advance of the weld point is held sufficiently spaced from the plate to maintain said V-shaped gap.

References Cited in the file of this patent

UNITED STATES PATENTS

| | | |
|---|---|---|
| 1,542,984 | Blum | June 23, 1925 |
| 2,062,875 | Gardner | Dec. 1, 1936 |
| 2,107,831 | Morseth | Feb. 8, 1938 |
| 2,139,211 | Sessions | Dec. 6, 1938 |
| 2,147,868 | Von Hemke | Feb. 21, 1939 |
| 2,376,762 | Ferguson | May 22, 1945 |
| 2,459,625 | Copp | Jan. 18, 1949 |